March 3, 1964

R. R. FONTAINE ETAL 3,123,659

SERVO SYSTEM FOR CONTROLLING THE OSCILLATION OF A SHAFT
THROUGH VARIABLE SECTORS OF ROTATION

Filed Oct. 26, 1961

INVENTOR.

BY

INVENTOR.
BY

United States Patent Office 3,123,659
Patented Mar. 3, 1964

3,123,659
SERVO SYSTEM FOR CONTROLLING THE OSCILLATION OF A SHAFT THROUGH VARIABLE SECTORS OF ROTATION
Robert R. Fontaine, Riverdale, and Jerome M. Raffel, Hyattsville, Md., assignors to ACF Industries, Incorporated, New York, N.Y., a corporation of New Jersey
Filed Oct. 26, 1961, Ser. No. 147,811
1 Claim. (Cl. 35—10.4)

This invention relates to servo systems for controlling the oscillation of a shaft through variable sectors of rotation and, more particularly, to an antenna shaft scan control system.

Most controlled amplitude, controlled direction sector scan systems, such as those used in radar systems, utilize closed loop servo systems in conjunction with a pilot's indicator. The pilot's indicator shows a marker indicating aircraft's heading and may show markers indicating the center line of the sector being scanned and the instantaneous direction of the antenna as it scans back and forth across the sector. The aircraft heading marker is obtained from the aircraft's navigational receivers, the sector center line is usually manually cranked into position on the indicator and the scanning antenna direction is obtained from an output shaft in a servo link following the antenna azimuth drive motor. The output shaft may drive a resolver whose output in turn is applied to the deflection yoke of the pilot's indicator, producing an electromagnetic field that rotates in synchronism with antenna rotation. An additional loop compares the output shaft position with the selected center of the scanned area and the limits of the width of the sector and controls the antenna azimuth drive motor to conform in the desired pattern. The equipment necessary in the previous systems involves amplifiers, discriminators and two servo loops with a corresponding complexity of equipment.

The present invention is an improvement over the older systems in that one servo loop and electronic discriminator are replaced by a control transformer and a potentiometer with a resulting saving in cost and complexity. In addition to its use as an antenna shaft scan control system on its own merits, the present invention can be used to simulate the operation of the old system as well as being applicable in any servo system where it is desirable to control the position and amplitude of an oscillating shaft.

It is accordingly an object of this invention to provide an improved servo system for controlling the oscillation of a shaft through variable sectors of rotation.

It is a further object to provide an improved antenna shaft scan control system.

It is a still further object to provide a simple servo system that can be used to simulate the operation of an antenna shaft scan control system.

It is a feature of this invention that it provides a simplified control of variable sector width and sector center line scanning equipment with minimum complexity, volume and cost of control components.

These and additional objects and features will become more fully appreciated after referring to the accompanying drawings and description in which:

FIG. 3 is an electrical block diagram showing typical components which may be connected to obtain the display of FIG. 1 from the servo system of FIG. 2.

Figure 1:
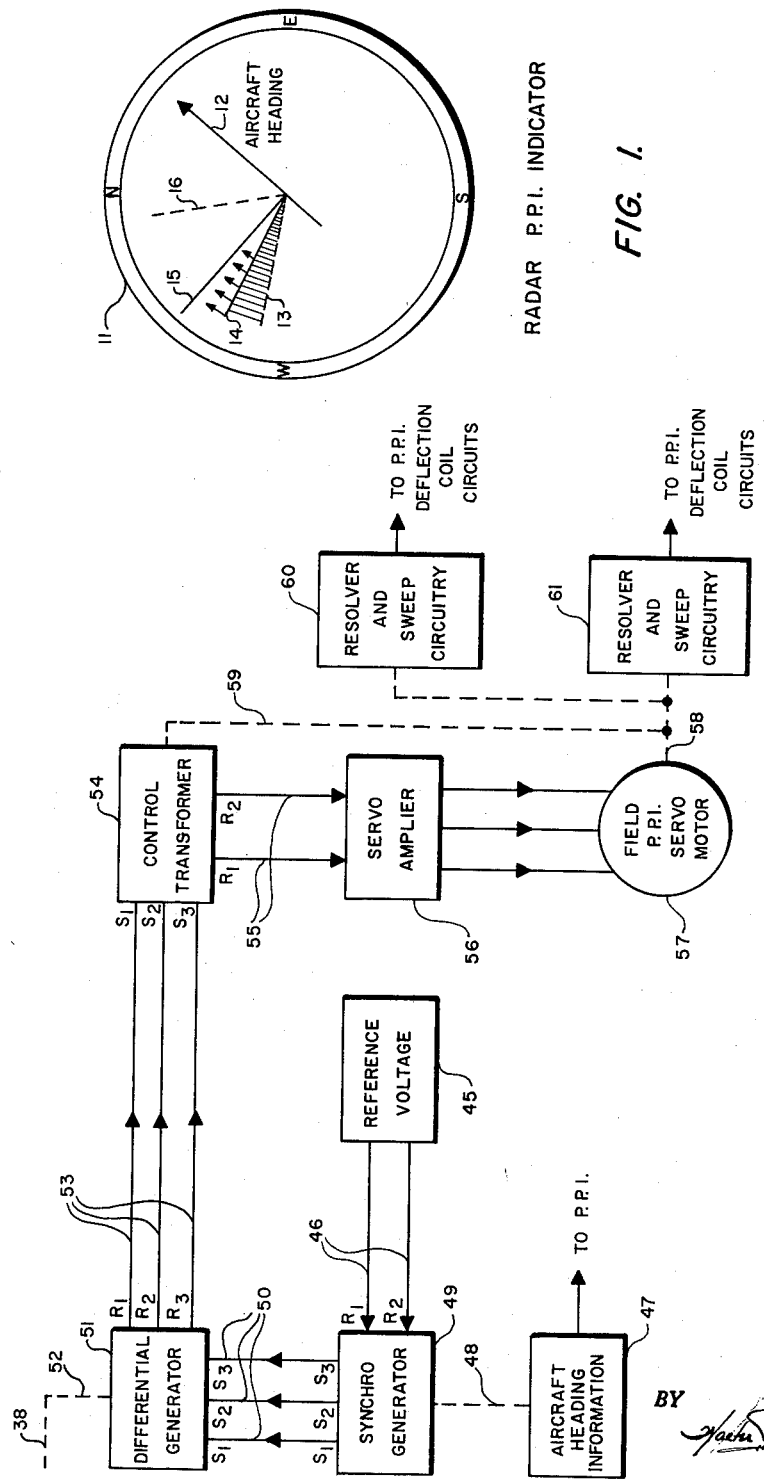
FIG. 1 is a diagrammatic representation of a typical pilot's indicator displaying the scan area as controlled by the antenna shaft scan control system of the present invention.

Referring to FIG. 1, the pilot's indicator shown is a plan position indicator 11 with the instantaneous heading of the aircraft indicated by the arrow headed marker 12. The center line 15 of the selected sector through which the antenna scans back and forth is in the center of the two radii 13 and 16 which mark the outside limits of the sector width. As the antenna oscillates back and forth through the sector, the plan-position range trace 14 oscillates about the center of the sector in such a way that the angle of the trace is always the same as the azimuth angle of the antenna. The display on the indicator at all times represents a visual presentation of the actual relative position of the antenna and aircraft heading with respect to true North as indicated by the letter N at the top of the indicator. In practice the heading marker may be fixed and the points of the compass rose may rotate depending upon the indicator design employed.

Figure 2:
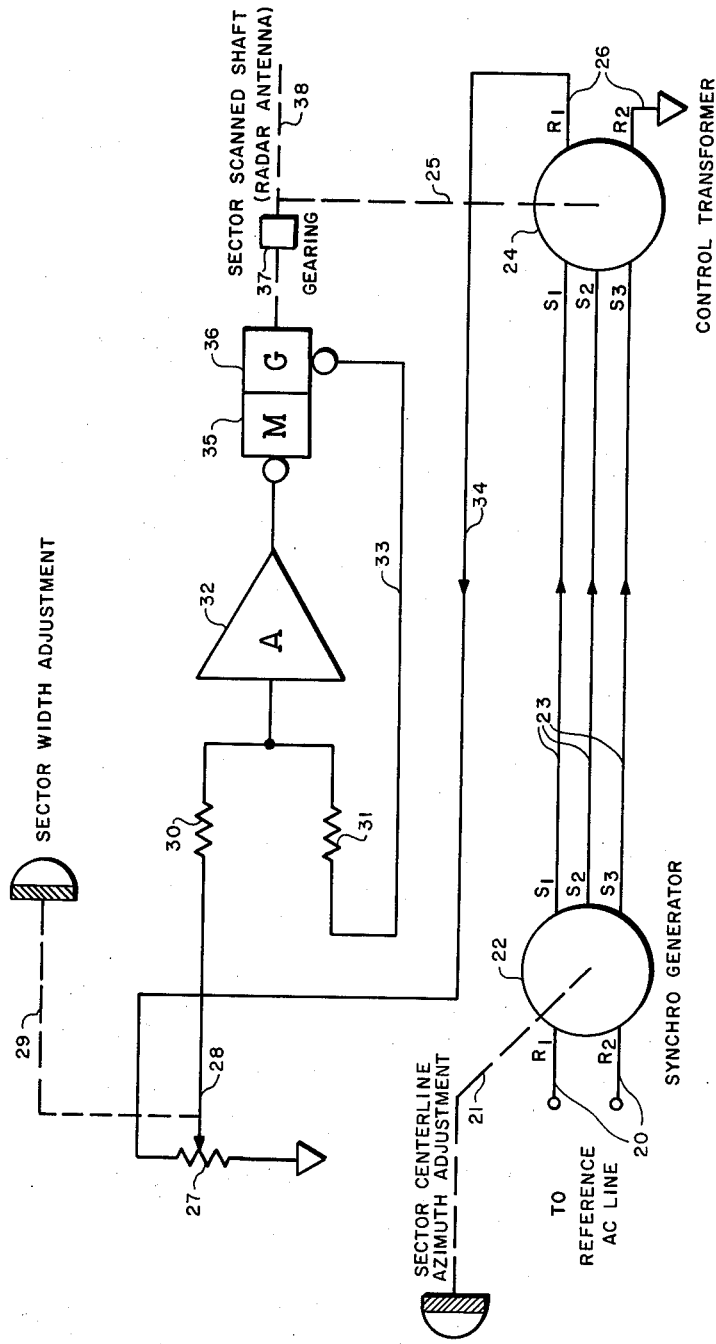
FIG. 2 is an electrical block diagram of the servo control system of the present invention.

The servo system employed to vary the azimuth position of the sector center line 15 and the width of the sector as represented by the limiting radii 13 and 16 is shown in FIG. 2 in which:

Synchro Generator 22 has its rotor windings 20 connected to a source of reference voltage and its stator windings 23 connected to the corresponding stator windings of Control Transformer 24. The rotor shaft 21 of Synchro Generator 22 is displaced with respect to the stator windings according to the desired sector center line azimuth angle. The rotor windings 26 of Control Transformer 24 are connected in series with the resistance of potentiometer 27 and ground potential by a suitable connection 34. The rotor shaft 25 of Control Transformer 24 is mechanically coupled to the Sector Scanned Shaft (Radar Antenna) 38. The pick-off arm 28 of potentiometer 27 is positioned for picking off a suitable voltage from potentiometer 27 by the sector width adjustment 29. Resistance 30 connects pick-off arm 28 to the input of servo amplifier 32. The shaft of the constant Slew Speed Motor 35 is mechanically coupled to the shaft of Generator 36 which in turn is mechanically coupled through suitable gearing 37 to the Sector Scanned Shaft (Radar Antenna) 38. The electrical output of Generator 36 is fed back by a suitable connection 33 through resistance 31 to the input of Amplifier 32 where it is shown connected to one end of resistance 30.

The system operates in the following manner. The reference voltage applied to the rotor windings 20 of Synchro Generator 22 induce voltages in the stator windings 23 that are proportional to the position of the rotor shaft 21 which has been set to the sector center line azimuth position. These voltages are applied to the stator windings of Control Transformer 24 and rotate the direction of the stator field in the control transformer in the direction of the desired center line azimuth setting. The rotor shaft 25 and the rotor of Control Transformer 24 are mechanically coupled to the Sector Scanned Shaft (Radar Antenna) 38. Thus, the voltages induced in the rotor windings 26 of Control Transformer 24 are proportional to the number of degrees of antenna deviation from the desired center line azimuth setting.

It will be assumed that initially the antenna is oriented in the direction indicated by the center line 15 of FIG. 1 and is travelling clockwise. For this condition, the rotor shaft 25 and rotor of Control Transformer 24 are oriented in the direction of the stator field and the error voltage output of rotor windings 26 is zero. Slew Motor 35 is driving Generator 36 at the relatively constant slew speed, so the electrical output of the Generator fed back through dropping resistance 31 is at a high value. The rotor windings 26 of Control Transformer 24 are connected to the input of Amplifier 32 in such a manner that the error voltage for the clockwise half of the sector is 180 degrees out of phase with the feedback voltage from connection 33. Since, however, the error voltage is zero when the antenna is at the desired sector center line, the feedback voltage continues to drive the antenna shaft 38 in the clockwise direction. As the antenna continues to rotate clockwise, the error voltage on rotor windings 26 of Control Transformer 24 as dropped through potentiometer 27 and resistance 30 builds up to oppose the feedback voltage 33. As the antenna approaches the limit of the sector width set by width adjustment 29, the error voltage which is bucking the feedback voltage approaches a magnitude which reduces the resultant input voltage to desaturate amplifier 32 by a small value and the motor starts to slow down. This in turn reduces the feedback voltage 33 from Generator 36 and the opposing error voltage continues to increase regeneratively. When the feedback voltage and error voltage are in equilibrium, which is at the clockwise extreme of the sector width indicated by radius 16 in FIG. 1, the motor stops and the feedback voltage is zero. The error voltage which is now the only voltage at the input of Amplifier 32 starts to drive the motor in the opposite direction, counterclockwise. This action is very regenerative and extremely fast turn arounds are achieved. As the motor is now rotating in a direction to drive the Sector Scanned Shaft (Radar Antenna) 38 counterclockwise, the generator feedback voltage reverses polarity and tends to reinforce the error voltage and the motor speeds up to slew speed. The preceding continues with the error voltage decreasing with counterclockwise rotation of the antenna until it reaches zero at the sector center line 15. As the antenna continues to rotate in a counterclockwise direction past the sector center line 15, the error voltage starts to build up again but this time with the reverse polarity and the error voltage now bucks the feedback voltage and tends to drive the antenna clockwise. This condition continues, with the error voltage increasing in magnitude until the antenna approaches the counterclockwise limit of the sector width represented by radius 13, when the error voltage again approaches a magnitude which reduces the resultant input voltage to amplifier 32 by a small value and slew motor 35 which has been driving the antenna shaft in a counterclockwise direction starts to slow down. This in turn reduces the feedback voltage while the opposing error voltage continues to increase. When the feedback voltage and error voltage are again in equilibrium, which is at the counterclockwise extreme of the sector width indication by radius 13 in FIG. 1, Slew Motor 35 stops and the feedback voltage goes to zero. The error voltage which is now the only voltage at the input of Amplifier 32 starts to drive the motor in the reverse direction, clockwise again. As the generator is now rotating in a direction to drive the antenna clockwise, the feedback voltage reverses polarity, tends to reinforce the error voltage and the motor speeds up to slew speed to drive the antenna in a clockwise direction as before. The width of the sector is determined by the point at which the error voltage dropped through potentiometer 27 and resistance 30 becomes equal to the feedback voltage 33 dropped through resistance 31 at the input to amplifier 32. The magnitude of the error voltage at the amplifier 32 and accordingly the sector width is determined by the setting of pick-off arm 28.

It should be noted that the described system can function with a sector width of zero degrees (a search light condition) by reducing the feedback voltage on connection 33 to zero in some suitable manner and can also be operated as a conventional 360 degree P.P.I. scan by setting the pick-off arm 28 of potentiometer 27 so that zero voltage is applied to Amplifier 32 through resistance 30.

The system of FIG. 2 has been described in terms of an actual antenna shaft sector scan control although the pilot's indicator of FIG. 1 was used as a descriptive aid. When used as a student trainer in flight simulating apparatus, the servo system of FIG. 2 is used in conjunction with an actual pilot's indicator. It then becomes necessary to reproduce the antenna shaft motion on the P.P.I. indicator.

The system of FIG. 3 is an example of a suitable servo system for this purpose. Aircraft Heading information from the simulated aircraft's flight navigation receiving equipment 47 is applied as a shaft input to the rotor shaft 48 of Synchro Generator 49. Reference voltage from a source 45 is applied to the rotor windings 46 of Synchro Generator 49 whose stator windings are connected to the stator windings 50 of Differential Generator 51. The voltages applied to these stator windings 50 rotate the direction of the stator field in Differential Generator 51 in synchronism with the simulated aircraft's heading. The rotor 52 of Differential Generator 51 is mechanically coupled to the antenna shaft 38 and therefore rotates in synchronism with antenna rotation. Therefore the voltages induced in the rotor windings 53 of Differential Generator 51 are proportional to the number of degrees of antenna deviation from true North. These voltages are applied to the stator windings of Control Transformer 54 and rotate the direction of the resultant stator field in synchronism with the antenna direction deviations from true North. This in turn induces a voltage in the rotor windings 55 of Control Transformer 54 proportional to the angle between the rotor and the direction of the stator field. The rotor voltages on rotor windings 55 are applied to servo amplifier 56. These voltages are amplified in Servo Amplifier 56 and applied to the field of P.P.I. Servo Motor 57 which is caused to rotate in a direction depending upon the direction of rotation of the antenna. Since the shaft 58 of Servo Motor 57 is mechanically coupled to the rotor shaft 59 of Control Transformer 54, and since the angle between the rotor winding of Control Transformer 54 and its stator field is proportional to the voltage induced in the rotor, the rotation of Servo Motor 57 is synchronized with the rotation of the antenna in azimuth. Servo Motor 57 is mechanically coupled to sweep resolvers 60 and 61 rotating them in synchronism with the antenna's azimuth. This modulates the sweep voltages in the P.P.I. indicator to rotate the sweep traces in synchronism with the antenna's rotation. Of course, heading information also has to be added to the P.P.I. indicator to produce the display shown in FIG. 1.

With the combination of FIG. 3 added to FIG. 1, the overall system becomes suitable as a student trainer as well as a complete antenna scan control and display system. Either of the controls, the Sector Width Adjustment 29 or Sector Center Line Azimuth Adjustment 21 of FIG. 2 or the aircraft heading information 47 of FIG. 3 can be adjusted by an instructor to display a particular situation to the student on the radar indicator 11 of FIG. 1 for the student's observation. Alternately or concurrently these adjustments can be made available to the student for extending or confining his field of search in response to other situations presented to him.

It should be understood that a preferred embodiment of the present invention has been described using specific terms and examples but using them in a generic and descriptive sense and not for purposes of limitation, as the scope of the invention is set forth in the following claim.

What is claimed is:

A student trainer for simulating a controlled antenna sector scan system in a mobile craft comprising: a source of reference voltage; a synchro generator and control transformer each having a rotor, rotor windings, and stator windings, said synchro generator and control transformer stator windings being connected together, said generator rotor windings being connected to said voltage source; means for displacing said generator rotor in accordance with a desired sector center line; a constant speed motor; a second generator which rotates in synchronism with said motor, said rotation actuating the simulated antenna sector scanning and causing the control transformer rotor to be displaced in synchronism with said simulated antenna scanning motion; voltage varying means; means for varying the voltage output of said varying means in accordance with a desired sector width; amplifier means connected between said voltage output of said varying means and the motor; feedback means for feeding back a portion of the second generator output to said amplifier; means for connecting the control transformer rotor windings to the voltage varying means so that said rotor windings output applied to the amplifier is 180 degrees out of phase with said feedback output when the antenna rotates away from said sector center lines; means for simulating mobile craft navigational information; indicating means for displaying a trace corresponding to the simulated antenna direction; means for positioning traces on said indicating means; servo mechanism means coupled to said simulated navigational information means and said simulated scanning motion for actuating said positioning means to position a trace on said indicating means corresponding to the simulated antenna orientation responsive to said simulated navigational information and simulated scanning motion.

References Cited in the file of this patent

UNITED STATES PATENTS

| | | |
|---|---|---|
| 2,718,001 | Greenwood | Sept. 13, 1955 |
| 2,727,229 | Anast et al. | Dec. 13, 1955 |
| 2,737,653 | Shreve et al. | Mar. 6, 1956 |
| 2,859,396 | King | Nov. 4, 1958 |
| 2,885,620 | Haas | May 5, 1959 |
| 2,977,687 | Bailey et al. | Apr. 4, 1961 |